United States Patent [19]

Hunter

[11] Patent Number: 4,684,667
[45] Date of Patent: Aug. 4, 1987

[54] TERTIARY AMINE RESINS AND USE THEREOF

[75] Inventor: Douglas L. Hunter, Lake Jackson, Tex.

[73] Assignee: The Dow Chemical Company, Midland, Mich.

[21] Appl. No.: 854,459

[22] Filed: Apr. 21, 1986

[51] Int. Cl.$^4$ ................................................ C08F 8/32
[52] U.S. Cl. .................................. 521/32; 525/332.2; 525/333.4; 525/333.6; 525/366
[58] Field of Search ........................... 521/32; 525/366

[56] References Cited

U.S. PATENT DOCUMENTS

| | | | |
|---|---|---|---|
| 2,597,440 | 5/1952 | Bodamer | 525/332.2 |
| 2,614,099 | 10/1952 | Bauman et al. | 521/32 |
| 2,616,877 | 11/1952 | McMaster | 521/32 |
| 2,992,544 | 7/1961 | McMaster | 521/32 |
| 3,277,024 | 10/1966 | Hatch | 521/32 |
| 3,300,416 | 1/1967 | Hatch | 521/32 |
| 4,177,140 | 12/1979 | Smakman | 521/32 |
| 4,298,700 | 11/1981 | Takase | 521/32 |
| 4,442,231 | 4/1984 | Kataoka et al. | 521/32 |

Primary Examiner—Joseph L. Schofer
Assistant Examiner—B. Lipman
Attorney, Agent, or Firm—James H. Riley; A. Cooper Ancona

[57] ABSTRACT

Basic polymers useful as weak base catalyst support for rhodium in a one-step hydroformylation/reduction of an olefin to an alcohol are prepared by reacting chloromethylated polystyrene resin with an alkoxide of an alkanolamine in a nonaqueous solution. The reaction product has repeating units of the formula:

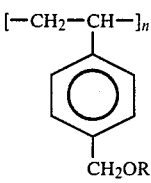

wherein R is an aliphatic tertiary amine and n is the number of repeating units in the polymeric structure.

8 Claims, No Drawings

TERTIARY AMINE RESINS AND USE THEREOF

FIELD OF THE INVENTION

This invention relates to weakly basic polymer resins and to a method of their production. More specifically, the invention relates to polystyrene resins having pendent tertiary amine functionality and to a method for producing such resins.

BACKGROUND

In hydroformylation/reduction technology, the one-step reaction for converting an olefin to an alcohol requires the utilization of a catalyst, such as rhodium or cobalt. Rhodium is the preferred catalyst, and it is advantageous for economic reasons to use it on a support. However, such a support is difficult to obtain because it must possess two critical features: low rhodium leach and adequate chemical stability. In addition, the support should be relatively easy to handle.

Although the hydroformylation step of the process can use a homogeneous rhodium catalyst, the reduction step requires the presence of a tertiary nitrogen and rhodium. If the tertiary nitrogen on the resin is depleted, there is a decrease in the activity of the process for reduction. Therefore, an ideal support should incorporate both rhodium and a tertiary amine that is chemically stable.

Some of the materials previously used as a catalyst support include Amberlite IRA-68 (trademark of Rohm & Haas), Reilly R8050 (trademark of Reilly Tar and Chemical Co.) and Dowex MWA-1 (trademark of The Dow Chemical Company). However, these materials require special treatment or have higher rhodium leach and/or lower chemical stability than desired. Consequently, there is still a need in the industry for a better catalyst support for rhodium during the hydroformylation/reduction of an olefin to an alcohol.

SUMMARY OF THE INVENTION

A weakly basic polymer resin having the following chemical formula is useful as a catalyst support for rhodium during the hydroformylation/reduction of olefins to alcohols:

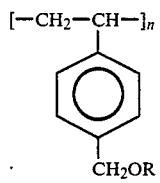

where R is an aliphatic tertiary amine and n is the number of repeating units in the polymeric structure.

In order for this resin to function properly it must have low quaternary amine impurities, i.e., low salt splitting capacity. A resin having low quaternary amine impurities can be prepared from a non-aqueous solution of chloromethylated polystyrene resin and an alkoxide of an alkanolamine, such as dimethylaminoethanol (DMAE).

DETAILED DESCRIPTION

The composition of this invention is a weakly basic polymeric resin which has utility as a catalyst support for rhodium in the one-step hydroformylation/reduction of olefins to alcohols. Because the resin is weakly basic, it can also be used as an ion exchange resin, especially where quaternary impurities in the resin are deleterious to the process in which it is to be used.

For the purposes of this invention, a resin is weakly basic if it has a weak base capacity of less than about 2.0 meq/ml; it has low quaternary amine impurities if it has less than about 5% quaternary nitrogen, i.e., less than about 5% salt splitting.

The resin of this invention is formed from chloromethylated polystyrene and an alkoxide of an aliphatic tertiary amine and has the following general formula:

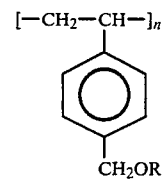

where R is derived from an aliphatic tertiary amine and n is the number of repeating units in the polymeric structure.

The preferred aliphatic tertiary amine is dimethylaminoethanol (DMAE), and the preferred alkoxide of DMAE is sodium N,N-dimethylaminoethoxide. When R is derived from DMAE, the resulting tertiary amine resin has the following chemical structure:

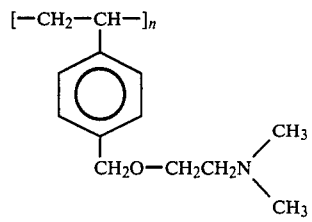

In order to perform satisfactorily as a catalyst support, the tertiary amine resin must have two critical features. First, the rhodium leach must be low, i.e., below about 5 ppm. Second, the resin must retain adequate chemical stability during the reaction, i.e., not undergo chemical reaction. The experimental conditions and results of several reactions involving this invention are given in the following examples and summarized in Table I.

EXAMPLE A

When toluene was the solvent, 1.5 g sodium was added to 5.9 g DMAE. When a precipitant started forming, 50 ml toluene (sodium dried) was added. The solution was heated to reflux and when all the sodium had reacted, 10 g of chloromethylated polystyrene resin was added to the solution. The mixture was heated for 2 hours and filtered to remove the resin. The resin was sequentially washed with 1 normal HCl, 1 normal NH$_4$OH, H$_2$O and MeOH and dried in vacuo at 90° C.

EXAMPLE B

Sodium salt of DMAE was prepared in excess DMAE. The solution was heated to about 100° C., and the resin was added. The mixture was kept hot for 1-2 hours and washed as described in Example A.

EXAMPLE C

Sodium salt of DMAE (1 g sodium in 25 cc DMAE) was warmed from the salt formation but was not heated. To the solution 5 g of resin was added, and the mixture was stirred overnight, then heated to about 100° C. for 2 hours.

EXAMPLE D

Sodium salt of DMAE (2.3 g sodium was mixed in 90 ml DMAE) was heated to 100° C. before adding polystyrene resin. 10 g of the resin was added and the temperature of the mixture ranged from 110° C. to 140° C. After 2 hours the solution cooled and the resin was filtered and washed as described in EXAMPLE A.

TABLE I

| Solvent | (°C.) | (hr) | Resin (g) | Na (g) | WBC[1] (meq/ml) | SSC[2] (meq/ml) | % SS[3] | Rhodium[4] Leach (ppm) |
|---|---|---|---|---|---|---|---|---|
| Toluene | 100 | 2 | 10 | 1.5 | 0.97 | 0.19 | 16 | 11 |
| DMAE | 100 | 2 | 3 | 0.75 | 0.83 | 0 | 0 | — |
| DMAE | 25/100 | 12/1 | 5 | 1 | 1.00 | 0 | 0 | — |
| DMAE | 110-140 | 2 | 10 | 2.3 | 1.09 | <0.01 | <1 | 4.6 |

[1] Weak Base Capacity
[2] Salt Splitting Capacity
[3] Percent Salt Splitting
[4] Preparation of dicyclopentadiene dimethanol, 4000 psig $CO/H_2$, 130° C., 17% THF in toluene, 4 g resin, 0.08 g $Rh_4(CO)_{12}$.

The starting resin in each of the foregoing experiments was a chloromethylated macroporous resin with 6% cross-linking, 42% diluent and 60% ring substitution. The resultant resin had a weak base capacity of less than 1.1 meq/ml. As illustrated in Table I the rhodium leach of the resin prepared in toluene was too high to be an acceptable catalyst support. The high rhodium leach is probably attributable to the relatively high salt splitting capacity, i.e., quaternary amine impurities. The rhodium leach for each of the resins prepared in DMAE solvent was acceptable.

The solvent used in the preparation of the resin is important because protic solvents, such as water, will destroy the alkoxide ion. When the alkoxide ion is not present, the amine will react with the chloromethylated molecule to yield a quaternary amine resin. Of course, this quaternary amine resin could be reacted with an alkanolamine alkoxide to yield the composition of this invention, but the extra step makes that process less economical.

As previously stated, the tertiary amine resin must have a low salt-splitting capacity, i.e., minimal quaternary amines, in order to be effective. Highly pure tertiary amine resins can be prepared from a non-aqueous solution of chloromethylated polystyrene plus the alkoxide of an alkanolamine. Examples of suitable alkanolamines may be prepared by reacting primary or secondary amines or ammonia with an epoxide, such as ethylene oxide, propylene oxide or butylene oxide. Suitable solvents for preparing the resin include dimethylaminoethanol, toluene, tetrahydrofuran (THF) and dimethyl ethers of ethylene glycols, e.g., glyme, diglyme, and dimethylsulfoxide (DMSO). The time required for the reaction to occur depends on the solvent, but it can be readily determined by one skilled in the art.

Table II illustrates the resin prepared from various solvents and sodium metal.

TABLE II

Resin Prepared from DMAE and Na Metal

| Resin[1] (g) | Na (g) | DMAE (g) | Solvent | Temp (°C.) | Time | WBC meq/ml | SSC meq/ml | % SS |
|---|---|---|---|---|---|---|---|---|
| 10 | 1.31 | 10.1 | DMSO | 110 | 1 hr | 0.62 | 0.25 | 32 |
| 10 | 1.32 | 5.1 | THF | reflux | 15 min | 0.14 | 0.30 | 68 |
| 10 | 1.32 | 5.1 | THF | reflux | 2 hr | 0.22 | 0.58 | 72 |
| 10 | 1.31 | 5.1 | Mixture[2] | reflux | 1 hr | 0.59 | 0.31 | 34 |
| 10 | 0.88 | 90 cc | DMAE | 75 | 2 hr | 0.59 | 0.80 | 58 |
| 10 | 0.88 | 80 cc | DMAE | 75 | 1 hr | 0.29 | 0.63 | 69 |
| 10 | 0.88 | 80 cc | DMAE | 115 | 10 min | 0.46 | 0.54 | 54 |
| 10 | 0.88 | 80 cc | DMAE | 115 | 2.5 hr | 1.0 | 0.04 | 4 |
| 10 | 2.3 | 80 cc | DMAE | 115 | 15 min | 0.56 | 0.43 | 43 |
| 10 | 2.3 | 80 cc | DMAE | 115 | 2 hr | 0.95 | 0.02 | 2 |
| 10 | 1.31 | 50 cc | DMAE | 110 | 1 hr | 1.39 | 0.065 | 4.5 |
| 60 | 7.9 | 340 | DMAE | 115 | 1 hr | 1.56 | 0.017 | 1 |
| 20 | 2.2 | 8.5 | Toluene | reflux | 5 hr | 1.21 | 0.06 | 5 |
| 20[3] | 2.2 | 8.5 | Toluene | reflux | 5 hr | 0.54 | 0.50 | 48 |
| 20[4] | 2.2 | 8.5 | Toluene | reflux | 5 hr | 0.32 | 0.59 | 63 |

[1] Chloromethylated macroporous resin with 6% cross-linking, 42% diluent and 60% ring substitution
[2] Toluene/Dimethoxyethane
[3] Dowex MSA-II (trademark of The Dow Chemical Co.)
[4] Dowex SAR (trademark of The Dow Chemical Co.)

Of course, other alkoxides may be used, and Table III illustrates the reaction product using various solvents and potassium hydroxide.

TABLE III

Resin Prepared from DMAE and KOH

| Resin[1] (g) | Solvent (50 ml) | KOH (g) | DMAE (g) | Time (hr) | Temp (°C) | WBC (meq/ml) | SSC (meq/ml) | % SS |
|---|---|---|---|---|---|---|---|---|
| 10 | Diglyme | 3.2 | 5.5 | 5 | 130 | 0.67 | 0.43 | 39 |
| 10 | Toluene | 3.2 | 11 | 5 | reflux | 1.0 | 0.1 | 9 |

TABLE III-continued

| | | Resin Prepared from DMAE and KOH | | | | | | |
|---|---|---|---|---|---|---|---|---|
| Resin[1] (g) | Solvent (50 ml) | KOH (g) | DMAE (g) | Time (hr) | Temp (°C.) | WBC (meq/ml) | SSC (meq/ml) | % SS |
| 10 | DMAE | 3.2 | solvent | 2 | reflux | 1.48 | <0.002 | <0.2 |
| 100 | DMAE | 32 | 400 cc | 2 | reflux | 1.64 | <0.0006 | <0.04 |
| 125 | Toluene[2] | 31[3] | 150 cc | 12 | reflux | 1.36 | <0.003 | <0.02 |
| 10[4] | H$_2$O | 10 | 0 | 3 | reflux | 0.34 | 1.40 | 80 |
| 10[5] | Mixture[6] | 10 | 0 | 3 | reflux[7] | 0.50 | 0.80 | 61 |

[1]Chlormethylated macroporous resin with 6% cross-linking, 42% diluent and 60% ring substitution
[2]1500 ml
[3]NaOH substituted for KOH
[4]Dowex SAR
[5]Dowex MSA-II
[6]Mixture of toluene and diglyme
[7]Removed H$_2$O prior to reflux Tests were conducted on the resin to determine chemical stability. The study employed the following procedure: Into a 300-cc autoclave was placed 4 g of the resin, 17 g of tetrahydrofuran and 75 g of toluene after which the reactor was pressurized with carbon monoxide (CO) and H$_2$ (mole ratio of CO/H$_2$=½) to a pressure of 4,000 psi and the contents heated to 130° C. Then 26.8 ml of a solution of dicyclopentadiene (DCPD) in toluene (90% by wt.) was added. The reaction began immediately and samples taken at intervals for analysis for a period of six hours or unitl chromatographic analysis indicated reaction to the desired product (DCPD-dimethanol) was complete. The resin of the present invention showed no chemical deactivation.

For comparison purposes the same tests were conducted with Amberlite IRA-68 (a [N,N-3-dimethylaminopropyl] acrylamide resin) and Reilly R8050 (a poly-4-vinylpyridine resin). Amberlite IRA-68 underwent a reaction of the amide linkage, and the pyridine rings of Reilly R8050 were reduced. Chemical instability of each of these resins limits their long-term efficiency.

The principle of the invention and the best mode contemplated for applying that principle have been described. It is to be understood that the foregoing is illustrative only and that other means and techniques can be employed without departing from the true scope of the invention defined in the following claims.

I claim:

1. A process for preparing a weakly basic, solid, polymeric resinous compound having repeating units of the formula:

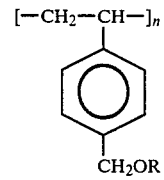

wherein R is an aliphatic tertiary amine and n is the number of repeating units in the polymeric structure, said process comprising:
preparing a nonaqueous solution of chloromethylated polystyrene resin and an alkoxide of an alkanolamine;
heating said solution to a temperature of from about 60° C. to about 150° C. or a period of time of from about 15 minutes to about 24 hours; and
recovering a reaction product in the form of discrete particles.

2. The process of claim 1 wherein said alkanolamine is dimethylaminoethanol.

3. The process fo claim 2 wherein said alkoxide is sodium N,N-dimethylaminoethoxide.

4. The process of claim 1 wherein said nonaqueous solution is dimethylaminoethanol.

5. The process of claim 4 wherein said alkanolamine is dimethylaminoethanol.

6. The process of claim 5 wherein said alkoxide is sodium N,N-dimethylaminoethoxide.

7. The process of claim 2 wherein said alkoxide is potassium N,N-dimethylaminoethoxide.

8. The process of claim 5 wherein said alkoxide is potassium N,N-dimethylaminoethoxide.

* * * * *